US012139338B2

(12) United States Patent
Wu et al.

(10) Patent No.: US 12,139,338 B2
(45) Date of Patent: Nov. 12, 2024

(54) ARTICLE TRANSPORTATION SYSTEM

(71) Applicant: BEIJING JINGDONG QIANSHI TECHNOLOGY CO., LTD., Beijing (CN)

(72) Inventors: Mingfu Wu, Beijing (CN); Fengquan Huang, Beijing (CN); Guoku Song, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 363 days.

(21) Appl. No.: 17/606,730

(22) PCT Filed: Apr. 8, 2020

(86) PCT No.: PCT/CN2020/083693
§ 371 (c)(1),
(2) Date: Oct. 26, 2021

(87) PCT Pub. No.: WO2020/220950
PCT Pub. Date: Nov. 5, 2020

(65) Prior Publication Data
US 2022/0227579 A1 Jul. 21, 2022

(30) Foreign Application Priority Data
Apr. 30, 2019 (CN) .......................... 201910361593.7

(51) Int. Cl.
*B65G 1/04* (2006.01)
*B65G 1/137* (2006.01)
(52) U.S. Cl.
CPC ......... *B65G 1/0492* (2013.01); *B65G 1/0407* (2013.01); *B65G 1/137* (2013.01)

(58) Field of Classification Search
CPC .... B65G 1/065; B65G 1/0471; B65G 1/0492; B65G 1/0435; B65G 1/0414
See application file for complete search history.

(56) References Cited

U.S. PATENT DOCUMENTS

| 2007/0065258 A1 | 3/2007 | Benedict et al. | |
| 2015/0037129 A1* | 2/2015 | Okamoto | B25J 11/005 414/800 |

(Continued)

FOREIGN PATENT DOCUMENTS

| CN | 102173334 A | 9/2011 |
| CN | 104386400 A | 3/2015 |

(Continued)

OTHER PUBLICATIONS

The Extended European Search Report for European Patent Application No. 20798774.4, dated Nov. 28, 2022.

(Continued)

*Primary Examiner* — Kaitlin S Joerger

(57) ABSTRACT

An article transportation system, including at least one access vehicle (1) and at least one transport vehicle (2), each access vehicle (1) is provided with a first drive assembly, and each transport vehicle (2) is provided with a second drive assembly; the first drive assembly is configured to drive the access vehicle (1) to travel on a preset plane and in a vertical direction, and the second drive assembly is configured to drive the transport vehicle (2) to travel on the preset plane; the access vehicle (1) or the transport vehicle (2) is provided with a transfer assembly (3); where the transfer assembly (3) is configured to transfer an article from one of the access vehicle (1) and the transport vehicle (2) to the other one when the access vehicle (1) and the transport vehicle (2) travel to a same position.

20 Claims, 11 Drawing Sheets

(56) References Cited

U.S. PATENT DOCUMENTS

| | | | |
|---|---|---|---|
| 2017/0152106 A1 | 6/2017 | Hofmann | |
| 2017/0267452 A1* | 9/2017 | Goren | B65G 1/0492 |
| 2018/0022547 A1* | 1/2018 | Wehner | B65G 1/065 |
| | | | 414/279 |
| 2018/0305122 A1 | 10/2018 | Moulin | |
| 2020/0180863 A1* | 6/2020 | Moulin | B65G 1/0492 |
| 2020/0277137 A1* | 9/2020 | Bastian, II | B66F 9/065 |
| 2020/0391944 A1* | 12/2020 | Kakinuki | B65G 1/0471 |
| 2021/0122569 A1* | 4/2021 | Cavelius | B65G 1/0485 |
| 2021/0188551 A1* | 6/2021 | Blotnik | B65G 47/8807 |
| 2022/0212867 A1* | 7/2022 | Wu | B65G 1/0435 |
| 2022/0227579 A1* | 7/2022 | Wu | B65G 1/0407 |

FOREIGN PATENT DOCUMENTS

| | | | |
|---|---|---|---|
| CN | 107635891 A | 1/2018 | |
| CN | 207404329 U | 5/2018 | |
| CN | 108706265 A | 10/2018 | |
| CN | 108726064 A | 11/2018 | |
| CN | 109153517 A | 1/2019 | |
| CN | 109264283 A | 1/2019 | |
| CN | 208761426 U | 4/2019 | |
| CN | 210122323 U | 3/2020 | |
| DE | 202018106944 U1 | 12/2018 | |
| JP | H06-42810 U | 6/1994 | |
| JP | H11-116006 A | 4/1999 | |
| JP | 2017210329 A | 11/2017 | |
| JP | 2018-516824 A | 6/2018 | |
| WO | 2018/189110 A1 | 10/2018 | |
| WO | 2019/072432 A1 | 4/2019 | |

OTHER PUBLICATIONS

The Decision to Grant a Patent for Japanese Patent Application No. 2021-563708, dated Jan. 5, 2023.

International Search Report dated Jul. 14, 2020 for International application No. PCT/CN2020/083693.

Notice of First Review Opinion dated Sep. 13, 2024 for Chinese Application No. 201910361593.7.

\* cited by examiner

ARTICLE TRANSPORTATION SYSTEM

This application is a national stage of International Application NO. PCTCN2020083693, filed on Apr. 8, 2020, which claims priority of the Chinese Patent Application No. 201910361593.7, titled "ARTICLE TRANSPORTATION SYSTEM", filed to China National Intellectual Property Administration on Apr. 30, 2019. The disclosures of the aforementioned applications are hereby incorporated by reference in their entireties.

TECHNICAL FIELD

The application relates to the field of logistics technology, and in particular, to an article transportation system.

BACKGROUND

With the rapid development of logistics industry, the transportation and sorting of articles such as goods is an important process of logistics industry. An article transportation system is presently provided, which can realize transportation of the articles. Specifically, the articles are obtained through the article transportation system, and then the articles are transported to the specified location, for example, to the place to be packed, or to the vehicle that needs to transport the articles.

For an article transportation system adopting the above technology, it takes long time and has poor flexibility. When inbound and outbound warehouse are frequent, it is easy to cause congestion, in addition, the waiting time of the service device leads to an increase of the operation time, which then affects the overall throughput of the warehouse system. On the other hand, the related art requires the use of auxiliary device such as hoisters and conveyor lines, and the cost of expenditure and maintenance is high.

SUMMARY

The application provides an article transportation system.

According to one aspect of the present application, an article transportation system is provided, including:
  at least one access vehicle and at least one transport vehicle;
  each of the access vehicle is provided with a first drive assembly, and each transport vehicle is provided with a second drive assembly;
  the first drive assembly is configured to drive the access vehicle to travel on a preset plane and in a vertical direction, and the second drive assembly is configured to drive the transport vehicle to travel on the preset plane; and
  the access vehicle or the transport vehicle is provided with a transfer assembly; where the transfer assembly is configured to transfer an article from one of the access vehicle and the transport vehicle to the other one when the access vehicle and the transport vehicle travel to a same position.

Further, the transfer assembly is located on the access vehicle;
  the access vehicle includes a first vehicle body, where the first drive assembly is located on the first vehicle body; the first vehicle body is also provided with a first control assembly, where the first control assembly is connected with the transfer assembly;
  the first control assembly is configured to control the transfer assembly to transfer an article to a transport vehicle located at the same position as the access vehicle, or obtain the article from the transport vehicle located at the same position as the access vehicle.

Further, the transfer assembly is an extension member; and the first control assembly is specifically configured to control extension and/or retraction of the extension member.

Further, an upper end of the first vehicle body is provided with a horizontal slide rail, a lower surface of the extension member is slidably connected with the horizontal slide rail, and an upper surface of the extension member is of a flat plate shape.

Further, the transfer assembly is a clamping member; and the first control assembly is specifically configured to control clamping and/or loosening of the clamping member.

Further, the first vehicle body is also provided with a navigation assembly, and the navigation assembly and the first drive assembly are respectively connected with the first control assembly; and
  the first control assembly is configured to obtain navigation information detected by the navigation assembly and send a drive signal to the first drive assembly according to the navigation information.

Further, the transport vehicle is provided with a bearing member; and
  the bearing member is configured to bear an article, or the bearing member is configured to receive an article on the transfer assembly.

Further, the transport vehicle includes a second vehicle body, and the bearing member is located on the second vehicle body;
  the second vehicle body is also provided with a lifting assembly and a second control assembly, the bearing member is located at the top end of the lifting assembly, and the second control assembly is connected with the lifting assembly; and
  the lifting assembly is configured to ascend and/or descend under control of the second control assembly to drive the ascending and/or descending of the bearing member.

Further, the bearing member includes a first concave part and a second concave part, where an opposite pair of edges of the first concave part are respectively provided with a first boss, an opposite pair of edges of the second concave part are respectively provided with a second boss, and a central axis of the first boss is parallel to a central axis of the second boss.

Further, the same position is located on any area outside an aisle of a shelf.

Further, the system further includes a shelf, and each of the access vehicles is configured to vertically travel on a shelf.

BRIEF DESCRIPTION OF THE DRAWINGS

The accompanying drawings herein are incorporated into the specification and constitute a part of the present specification, showing embodiments consistent with the present application, and are used together with the specification to explain the principles of the present application.

Figure 1:
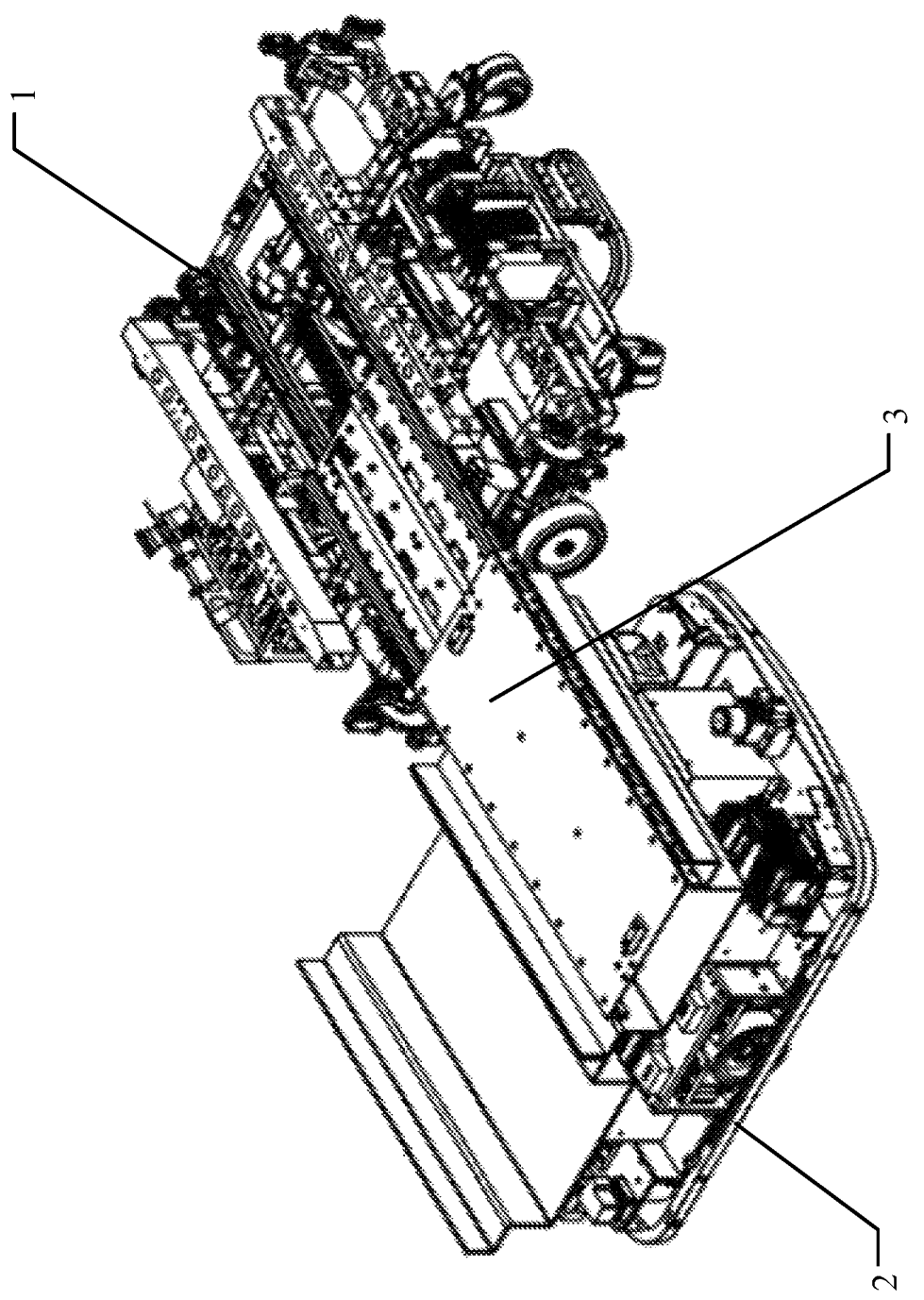
FIG. 1 is a structural schematic diagram of an article transportation system provided by an embodiment of the present application.

Through the above accompanying drawings, embodiments defined in the present application have been shown, and will be described in more detail hereinafter. These accompanying drawings and textual descriptions are not intended to limit the scope of the concept of the present application in any way, but to explain the conception of the application to those skilled in the art by referring to specific embodiments.

REFERENCE SIGNS

1—access vehicle;
2—transport vehicle;
3—transfer assembly;
4—first wheel structure;
5—second wheel structure;
6—shelf;
7—first vehicle body;
8—first control assembly;
9—first speed-limiting assembly;
10—navigation assembly;
11—first power supply assembly;
12—wheel assembly;
13—climbing assembly;
14—second vehicle body;
15—lifting assembly;
16—bearing member;
17—first concave part;
18—second concave part;
19—first boss;
20—second boss;
21—sorting device;
22—conveying device.

DESCRIPTION OF EMBODIMENTS

Here, exemplary embodiments will be illustrated in detail, and an example thereof is shown in the accompanying drawings. When the following description relates to the accompanying drawings, unless otherwise indicated, the same numbers in different accompanying drawings represent the same or similar elements. The implementation manner described in the following exemplary embodiments do not represent all embodiments consistent with the present application which, on the contrary, are only examples of systems and methods consistent with some aspects of the present application as expatriated in the appended claims.

The specific application scenario of the present application is: With the rapid development of logistics industry, the transportation and sorting of articles such as goods is an important process of logistics industry. An article transportation system is presently provided, which can realize transportation of the articles. Specifically, the articles are obtained through the article transportation system, and then the articles are transported to the specified location, for example, to the place to be packed, or to the vehicle that needs to transport the articles.

In the related art, a variety of article transportation systems are provided.

In the related art, the article transportation system consists of a shelf, a horizontal straight shuttle, a hoister and a conveyor line in the warehousing field, where the shelf includes a plurality of shelf unit layers, each shelf unit layer is provided with a horizontal track, and the horizontal straight shuttle can travel on the horizontal track to carry out the operations of articles in and out of the warehouse. Taking the warehouse-out operation as an example, when a warehouse-out instruction is received, a horizontal straight shuttle runs to a specified storage site, takes out an article by using its own handling assembly and then travels towards a position of a hoister of the layer, and applies for a dispatching service. In response to the request for dispatching service, the hoister moves vertically to the layer, and then the article handover with the horizontal straight shuttle is accomplished, then the article is transported to a conveyor line by the hoister, and transported to the peripheral cull eliminator by a conveyor line. In the article transportation system, the horizontal straight shuttle generally can only run on one shelf unit layer. If the layer needs to be changed, it needs to use the hoister to switch between different shelf unit layers.

However, in the above way, it takes time in a link of completing the article handover by the horizontal straight shuttle with the help of the hoister, as well as switching the shelf unit layer by the horizontal straight shuttle, and the driving trajectory is very fixed, which leads to poor flexibility. When inbound and outbound warehouse are frequent, it is easy to cause congestion, in addition, the waiting time of the service device leads to an increase of the operation time, which then affects the overall throughput of the warehouse system. On the other hand, the related art requires the use of auxiliary device such as hoisters and conveyor lines, and the cost of expenditure and maintenance is high.

A second article transportation system consists of at least one automatic guide vehicle. A shelf can be arranged, a height of which is low, for example, the height of the shelf is only 2.3 meters. An article is handled manually from the shelf and manually placed on the automatic guide vehicle; then the article is transported by the automatic guide vehicle. Or, the article is transported by the automatic guide vehicle to the location of the shelf, and then manually placed on the shelf.

However, in the above ways, manual handling of an article is required, which requires a lot of human resources and high cost; moreover, the manual handling of an article has low efficiency, so the efficiency of article transportation is low.

The article transportation system provided in the application aims to solve the above technical problems of the related art.

The technical solution of the present application and how the technical solution of the present application solves the above technical problems are described in detail with specific embodiments. The following specific embodiments may be combined with each other, and the same or similar conception or processes may not be repeated in certain embodiments. Hereinafter, embodiments of the present application will be described in combination with the accompanying drawings.

Figure 2:
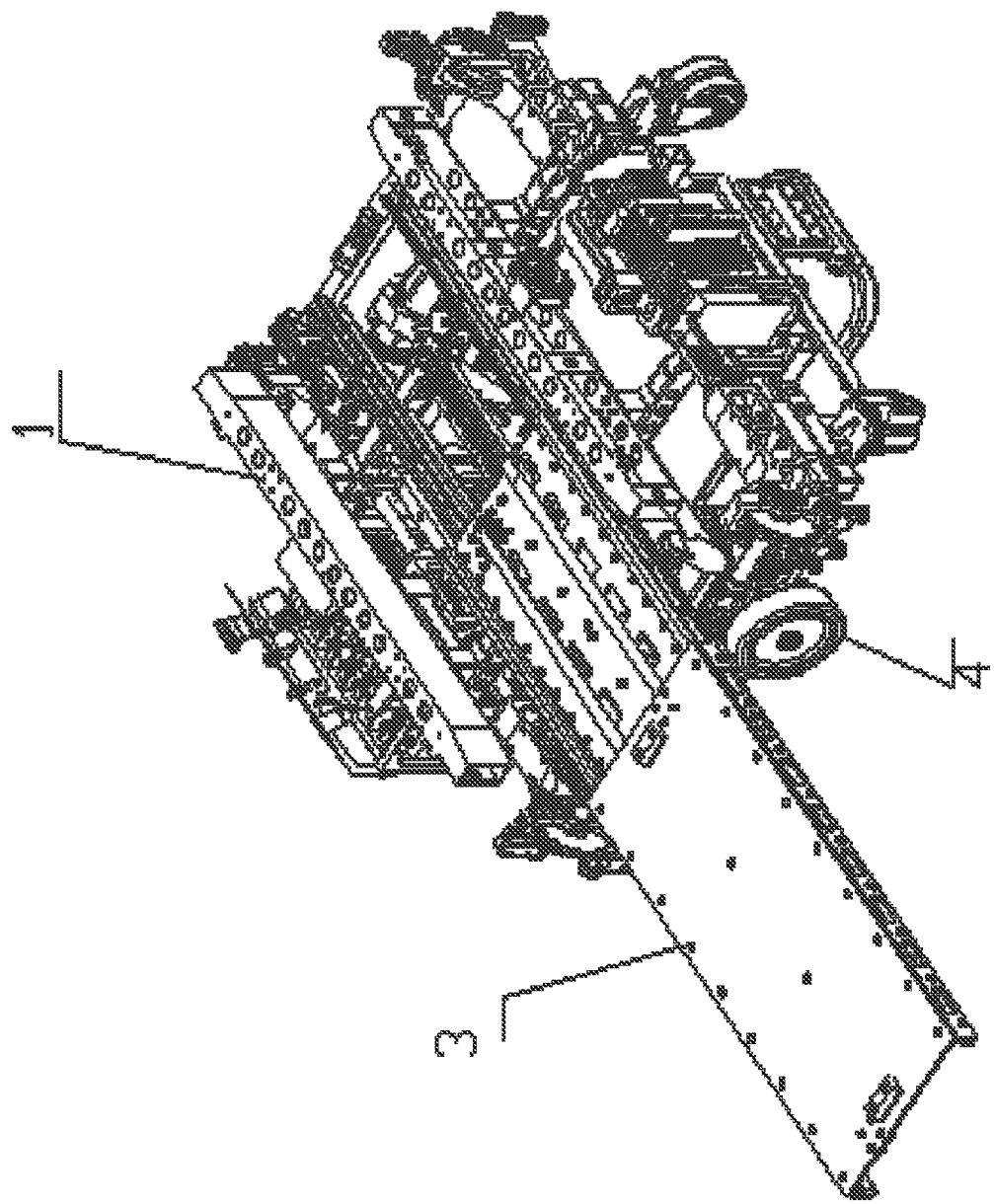
FIG. 2 is a structural schematic diagram of an access vehicle in an article transportation system provided by an embodiment of the present application.
Figure 3:
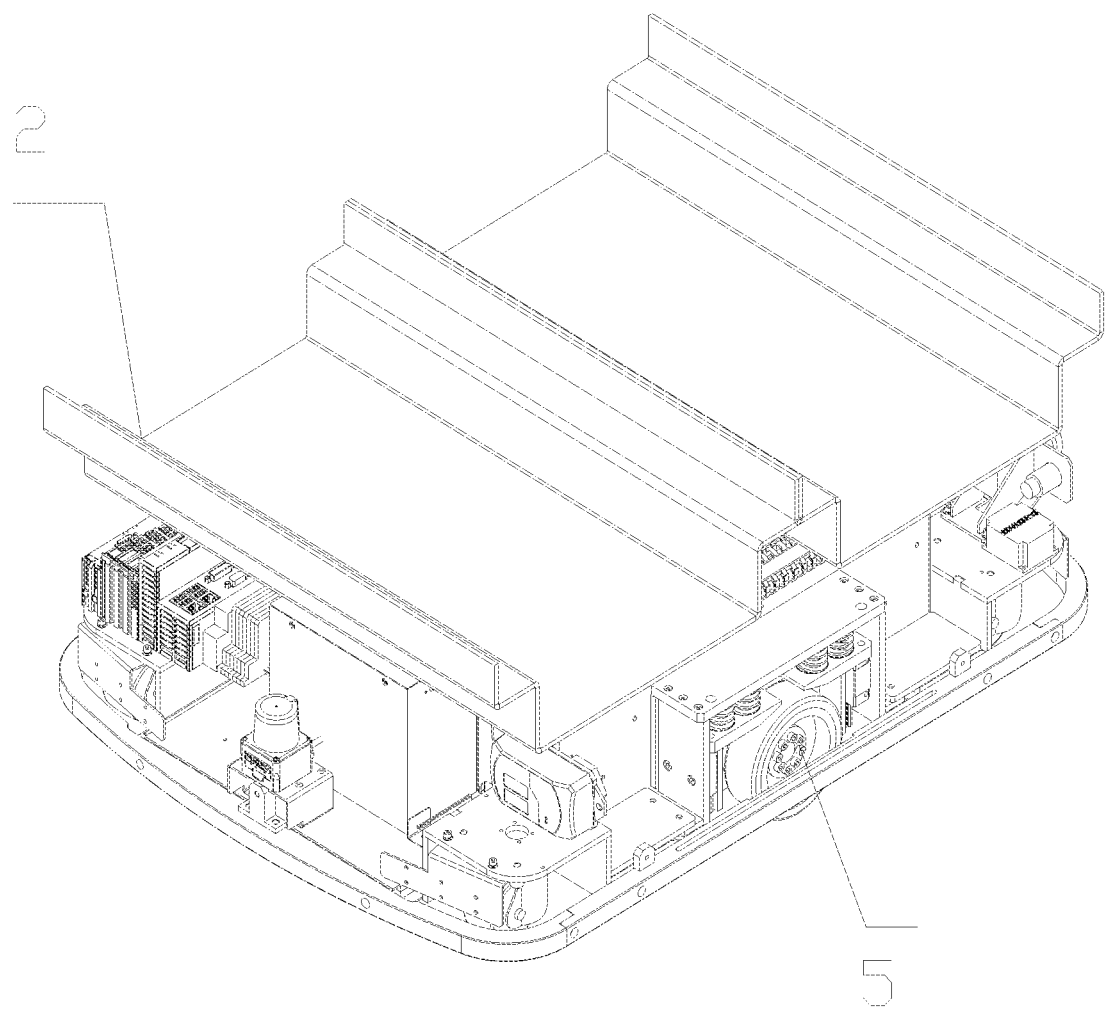
FIG. 3 is a structural schematic diagram of a transport vehicle in an article transportation system provided by an embodiment of the present application.

FIG. 1 is a structural schematic diagram of an article transportation system provided by an embodiment of the present application, FIG. 2 is a structural schematic diagram of an access vehicle in an article transportation system provided by an embodiment of the present application, and FIG. 3 is a structural schematic diagram of a transport vehicle in an article transportation system provided by an embodiment of the present application. As shown in FIG. 1 to FIG. 3, the article transportation system includes at least one access vehicle 1 and at least one transport vehicle 2.

Each access vehicle 1 is provided with a first drive assembly, and each transport vehicle 2 is provided with a second drive assembly.

The first drive assembly is configured to drive the access vehicle 1 to travel on a preset plane and in a vertical direction, and the second drive assembly is configured to drive the transport vehicle 2 to travel on the preset plane.

The access vehicle 1 or the transport vehicle 2 is provided with a transfer assembly 3; where the transfer assembly 3 is configured to transfer an article from one of the access vehicle 1 and the transport vehicle 2 to the other one when the access vehicle 1 and the transport vehicle 2 travel to a same position.

Exemplarily, an article transportation system consisting of at least one access vehicle 1 and at least one transport vehicle 2 is provided.

For each access vehicle 1, the access vehicle 1 is provided with a first drive assembly and a first wheel structure 4, where the first drive assembly can select and use an existing drive device or drive assembly, and the first wheel structure 4 can move on a preset plane and in a vertical direction; thus, the first drive assembly can drive the travel of the first wheel structure 4, and then drive the access vehicle 1 to travel on the preset plane or in a vertical direction. Optionally, the access vehicle 1 can adopt a shelf-climbable robot; the shelf-climbable robot can climb on the shelf, thus the shelf-climbable robot can climb in a vertical direction; the shelf-climbable robot can descend to an aisle of the shelf, and then the shelf-climbable robot can dock with the transport vehicle 2 on the aisle to transfer an article.

For each transport vehicle 2, the transport vehicle 2 are provided with a second drive assembly and a second wheel structure 5, where the second drive assembly can select and use an existing drive or drive assembly, and the second wheel structure 5 can move on a preset plane; thus, the second drive assembly can drive the travel of the second wheel structure 5, and then drive the transport vehicle 2 to travel on the preset plane.

In the application, vertical direction refers to the vertical direction in physics, including but not limited to the vertical direction and the vertical direction with a certain inclination angle. The preset plane refers to the plane in physics, but does not limit the altitude of the preset plane in physics; moreover, the preset plane can be a completely flat plane or a surface with a certain concave convex.

The transfer function of an article can be realized between the access vehicle 1 and the transport vehicle 2.

The transfer assembly 3 can be provided on the access vehicle 1. When an access vehicle 1 and a transport vehicle 2 travel to the same position, the transfer assembly 3 on the access vehicle 1 can transfer the article on the access vehicle 1 to the transport vehicle 2; alternatively, the transfer assembly 3 on the access vehicle 1 can take the article from the transport vehicle 2 and place them on the current access vehicle 1.

Or, the transfer assembly 3 may be provided on the transport vehicle 2. When an access vehicle 1 and a transport vehicle 2 travel to the same position, the transfer assembly 3 on the transport vehicle 2 can transfer the article on the transport vehicle 2 to the access vehicle 1; alternatively, the transfer assembly 3 on the transport vehicle 2 can take the article from the access vehicle 1 and place them on the current transport vehicle 2.

In the present application, the above article transfer process can be realized between any access vehicle 1 and any transport vehicle 2. Moreover, the above article transfer process can be completed at any position on any preset plane between any access vehicle 1 and any transport vehicle 2. Moreover, any access vehicle 1 can travel along a straight line or a curve on the preset plane, and any transport vehicle 2 can travel along a straight line or a curve on the preset plane.

Figure 4:
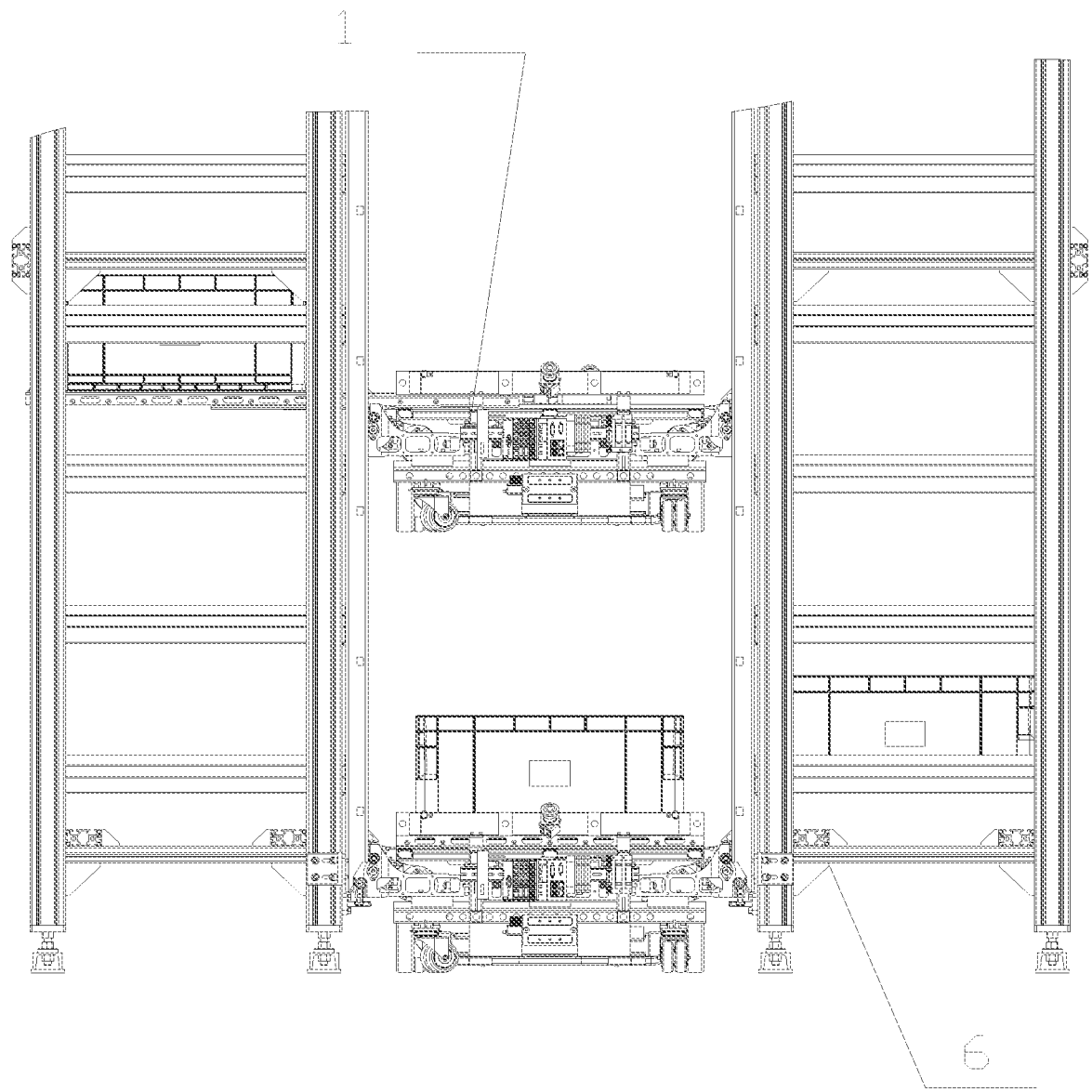
FIG. 4 is a schematic diagram of article transfer of an article transportation system provided by an embodiment of the present application.
Figure 11:
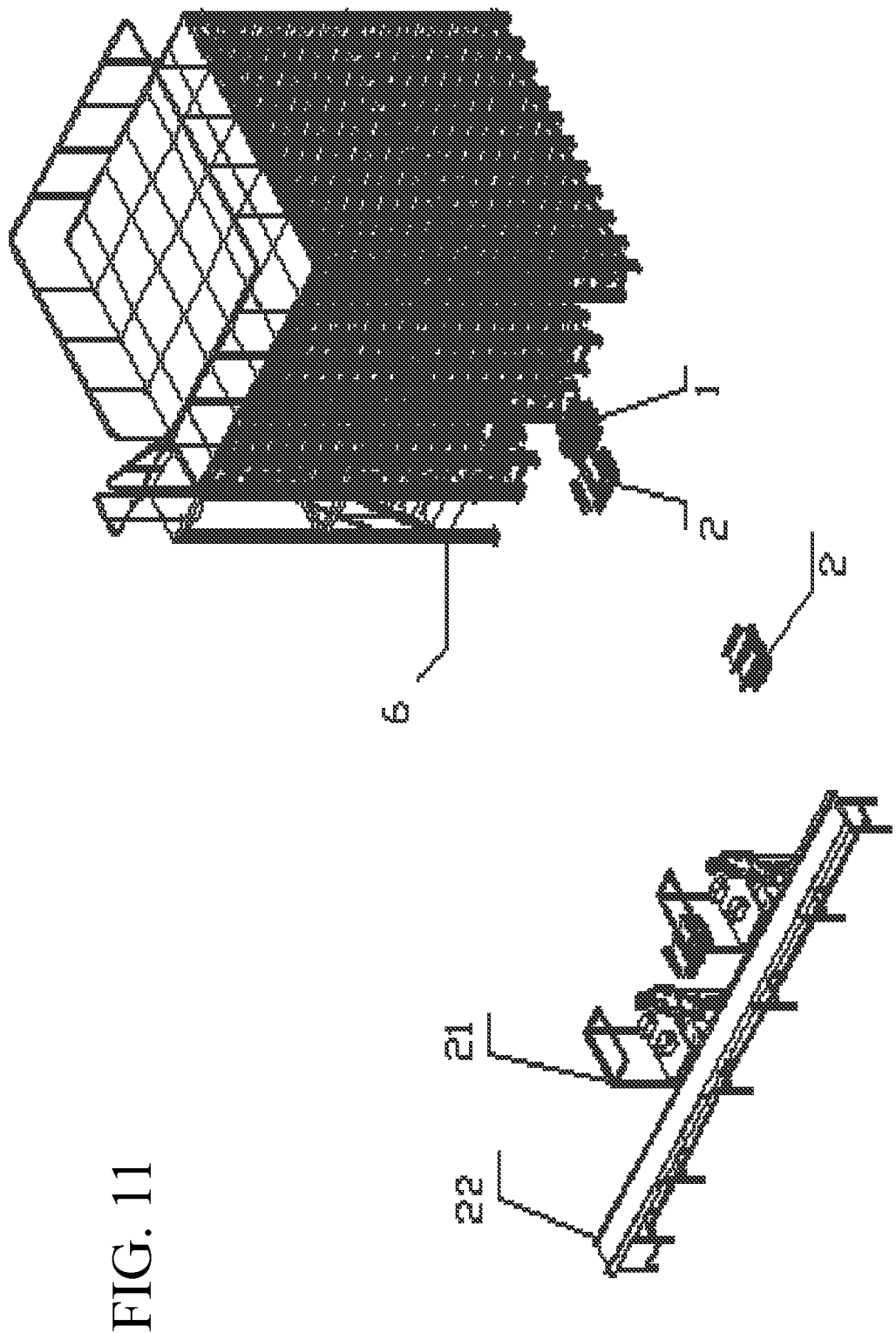
FIG. 11 is a structural schematic diagram of another article transportation system provided by an embodiment of the present application.

For example, FIG. 4 is a schematic diagram of article transfer of an article transportation system provided by an embodiment of the present application, as shown in FIG. 4, and as shown in FIG. 11, since the first drive assembly can drive the access vehicle 1 to travel in the vertical direction, a vertical track can be set in the vertical direction of the shelf 6, Thus, the access vehicle 1 can travel vertically on the vertical track of the shelf 6, that is, the access vehicle 1 can go up and down on the vertical track of the shelf 6; after the access vehicle 1 can obtain the article from the shelf 6, the access vehicle 1 leaves the shelf 6, the access vehicle 1 travels on the ground, and then the access vehicle 1 travels to a certain position on the ground; at this time, the transport vehicle 2 moves to this position on the ground; then, the transfer assembly 3 can transfer the article from the access vehicle 1 to the transport vehicle 2.

For another example, the access vehicle 1 travels on the ground, and then the access vehicle 1 travels to a certain position on the ground; at this time, the transport vehicle 2 also travels to this position; then, the transfer assembly 3 can transfer the article from the transport vehicle 2 to the access vehicle 1; then, the access vehicle 1 can travel vertically on the vertical track of the shelf 6, and then the access vehicle 1 places the article on the shelf 6.

For yet another example, the access vehicle 1 can travel vertically on the track of the shelf 6; after the access vehicle 1 can obtain the article from the shelf 6, since the top end of the shelf 6 is also provided with a top end track, the access vehicle 1 can travel on the top end track. Then, the access vehicle 1 travels to a certain position on the top end track. At this time, the transport vehicle 2 can also travel to this position on the top end track, and then complete the transfer of an article; alternatively, after the access vehicle 1 travels on the top end track, the access vehicle 1 leaves the shelf 6, and the access vehicle 1 travels to a certain position on a plane. At this time, the transport vehicle 2 also travels to this position, and then completes the article transfer.

For yet another example, the access vehicle 1 travels to a certain position on the top end track. At this time, the transport vehicle 2 can also travel to this position on the top end track, and then the transport assembly 3 transfers the article from the transport vehicle 2 to the access vehicle 1; alternatively, the access vehicle 1 travels to a certain position on a plane. At this time, the transport vehicle 2 also travels to this position. Then, the transfer assembly 3 transfers the article from the transport vehicle 2 to the access vehicle 1, and then the access vehicle 1 travels on the top end track. Then, the access vehicle 1 can travel vertically on the track of the shelf 6; the access vehicle 1 places the article on the shelf 6.

In the present embodiment, by providing an article transportation system composed of at least one access vehicle 1 and at least one transport vehicle 2, each access vehicle 1 is provided with a first drive assembly, and each transport vehicle 2 is provided with a second drive assembly; the first drive assembly is configured to drive the access vehicle 1 to travel on a preset plane and in a vertical direction, and the second drive assembly is configured to drive the transport vehicle 2 to travel on the preset plane; the access vehicle 1 or the transport vehicle 2 is provided with a transfer assembly 3; the transfer assembly 3 is configured to transfer an article from one of the access vehicle 1 and the transport vehicle 2 to the other one when the access vehicle 1 and the transport vehicle 2 travel to a same position. Any access vehicle 1 travels on a preset plane and in a vertical direction, and any transport vehicle 2 travels on the preset plane. When the access vehicle 1 and the transport vehicle 2 travel to a same position, the transport assembly 3 on the access vehicle 1 or the transport vehicle 2 transfers the article. Through the above process, the docking of an article can be completed between the access vehicle 1 and the transport vehicle 2, and the transfer of the article can be completed quickly. Then, the access vehicle 1 and the transport vehicle 2 can fetch or place an article again quickly, which can reduce the time consumed in the fetching and transportation of the article and improve the transportation efficiency of an article. Moreover, any access vehicle 1 and any transport vehicle 2 can dock at any position on a preset plane to realize the transfer of an article; due to the variety of docking positions, the efficiency of article transfer is high, and then the efficiency of article transportation is high; the manner of docking and transportation is very flexible.

Figure 5:
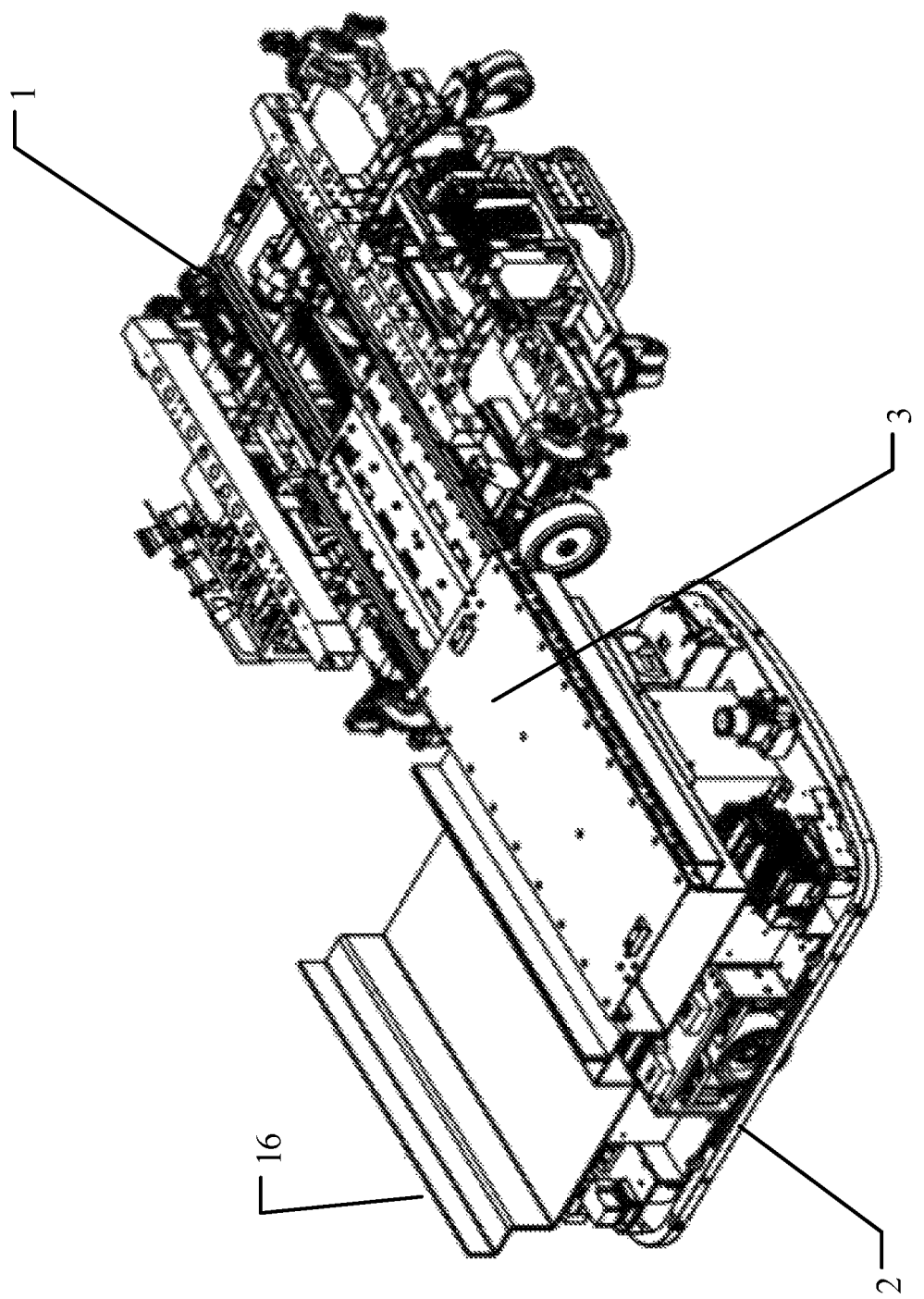
FIG. 5 is a structural schematic diagram of another article transportation system provided by an embodiment of the present application.
Figure 6:
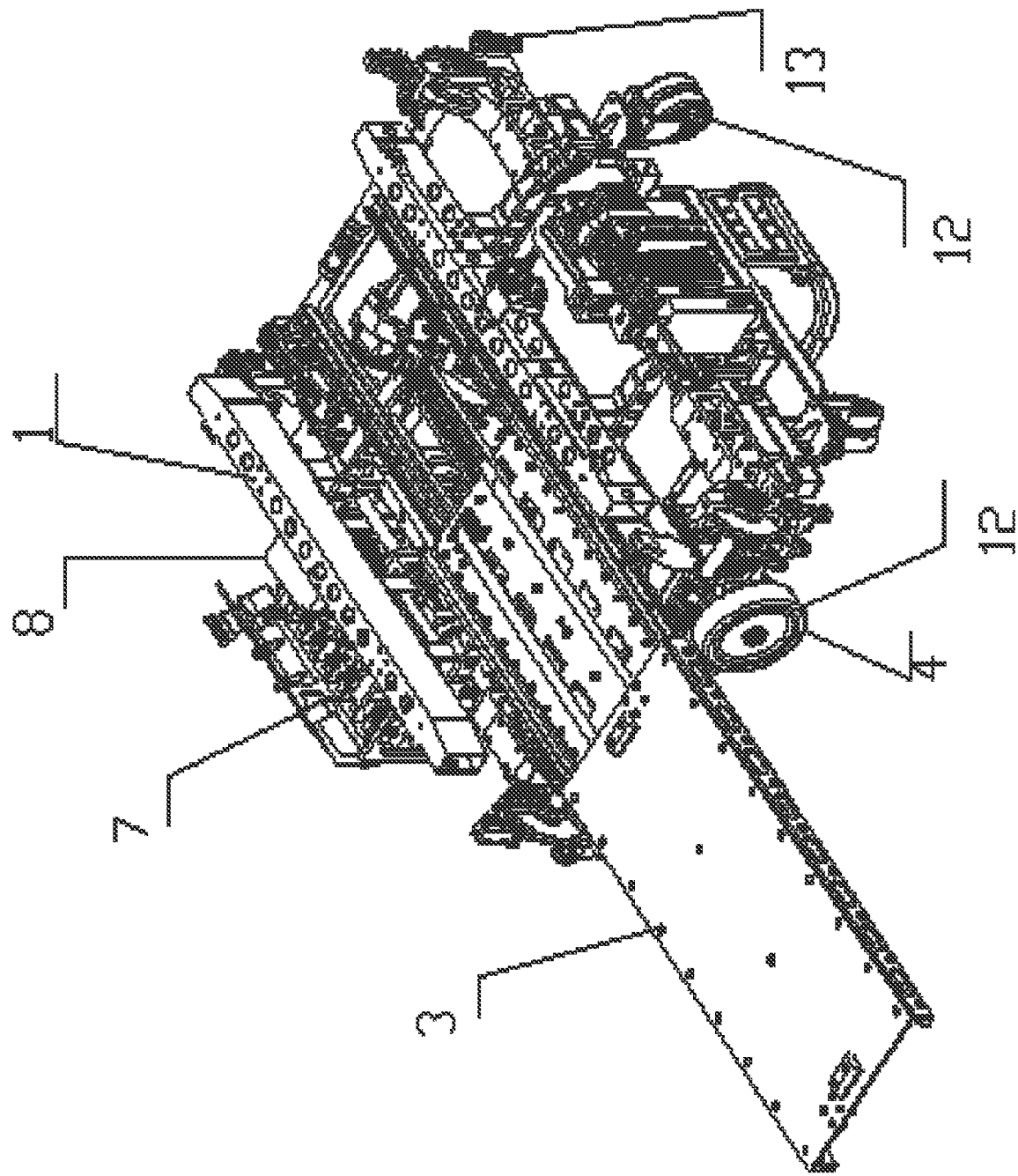
FIG. 6 is a first structural schematic diagram of an access vehicle in another article transportation system provided by an embodiment of the present application.
Figure 7:
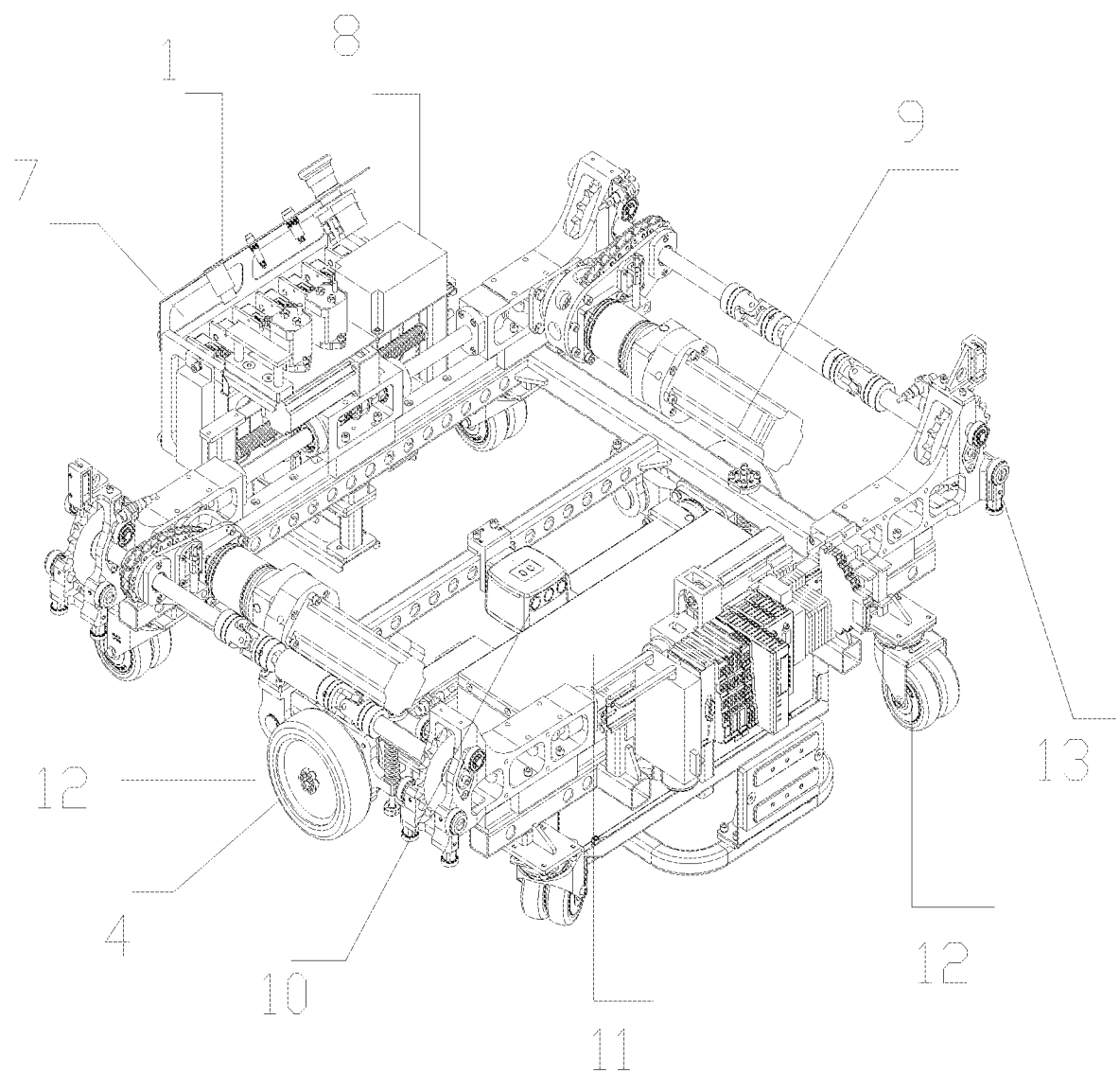
FIG. 7 is a second structural schematic diagram of an access vehicle in another article transportation system provided by an embodiment of the present application.
Figure 8:
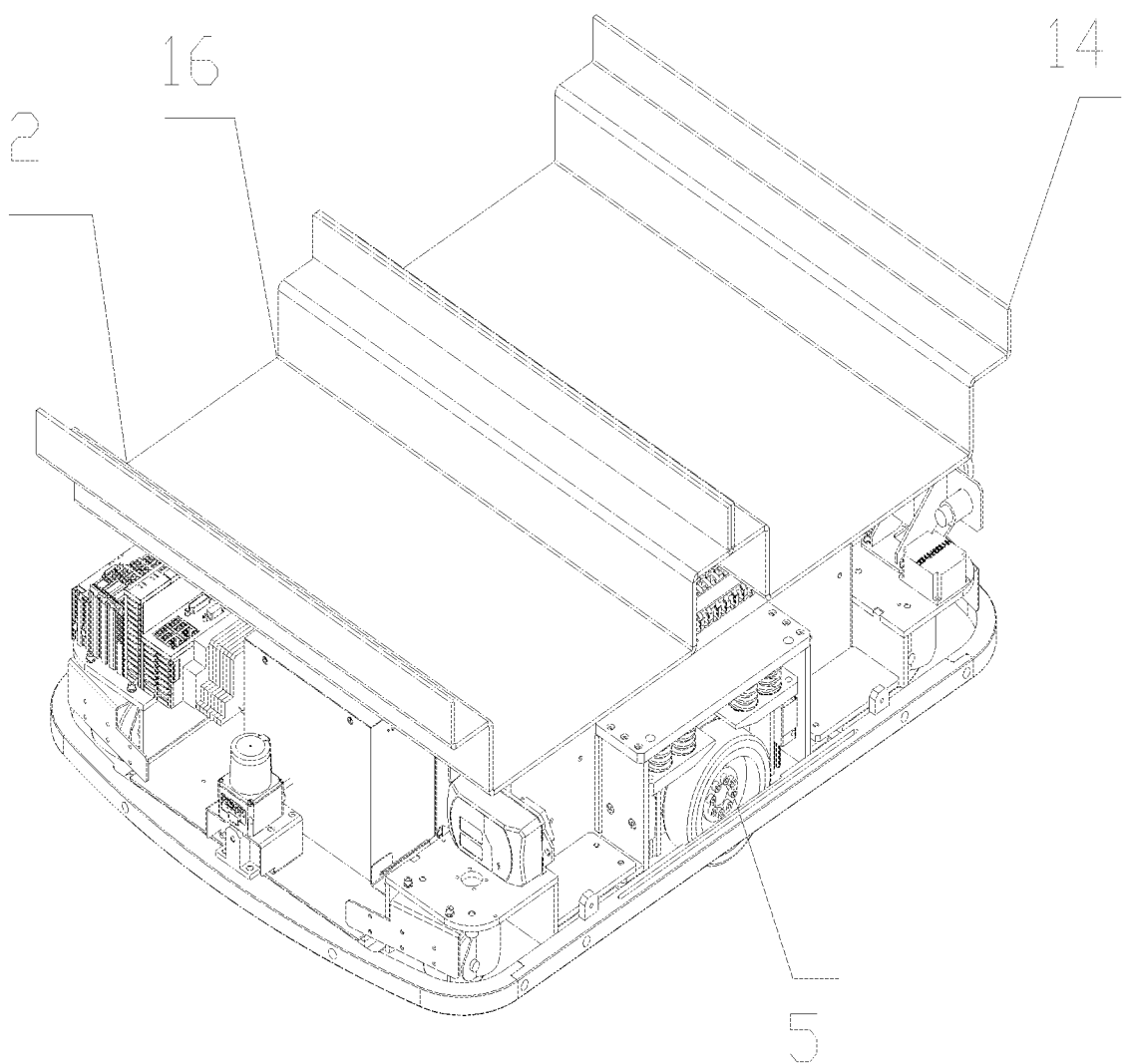
FIG. 8 is a first structural schematic diagram of a transport vehicle in another article transportation system provided by an embodiment of the present application.
Figure 9:
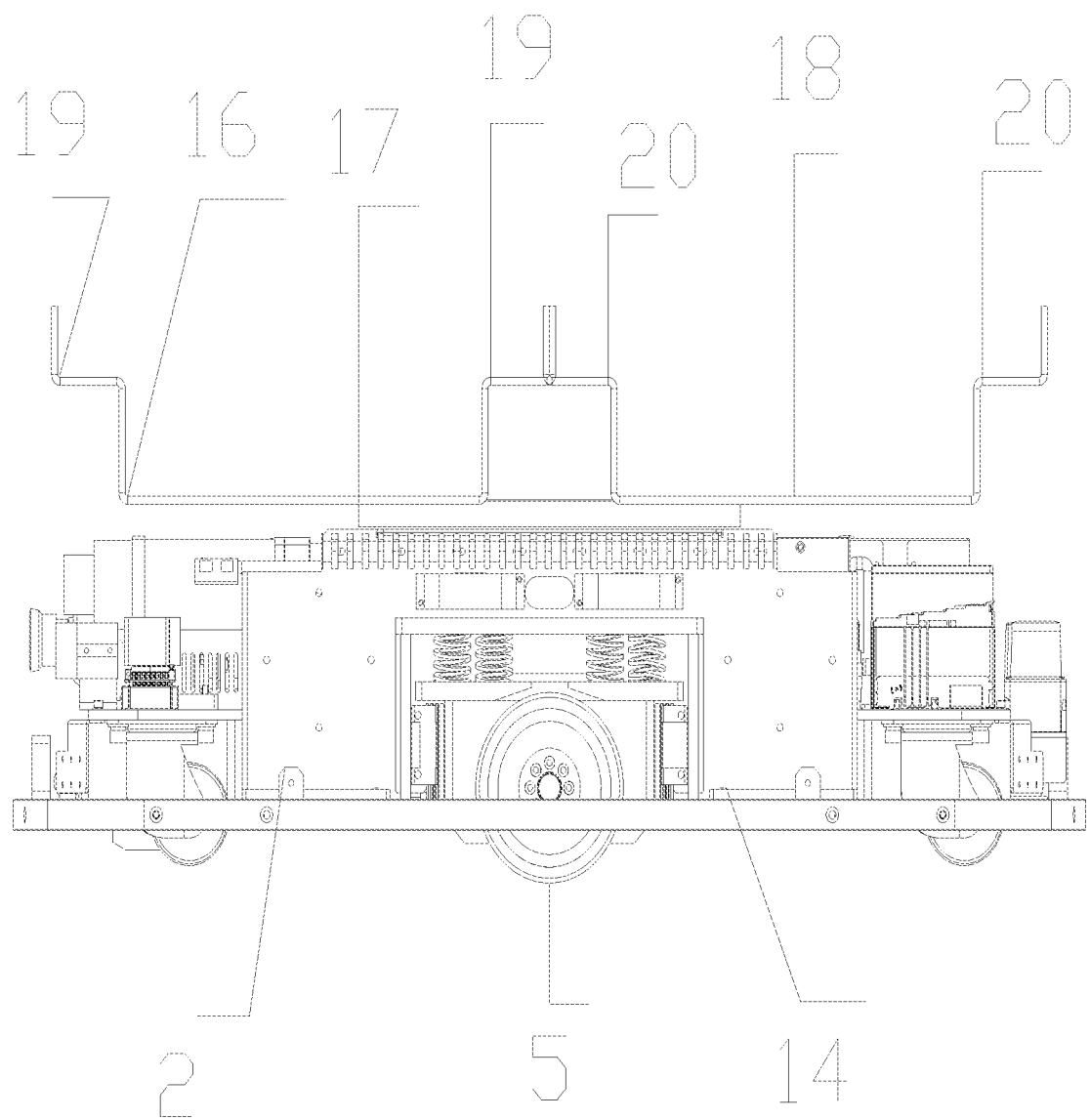
FIG. 9 is a second structural schematic diagram of a transport vehicle in another article transportation system provided by an embodiment of the present application.
Figure 10:
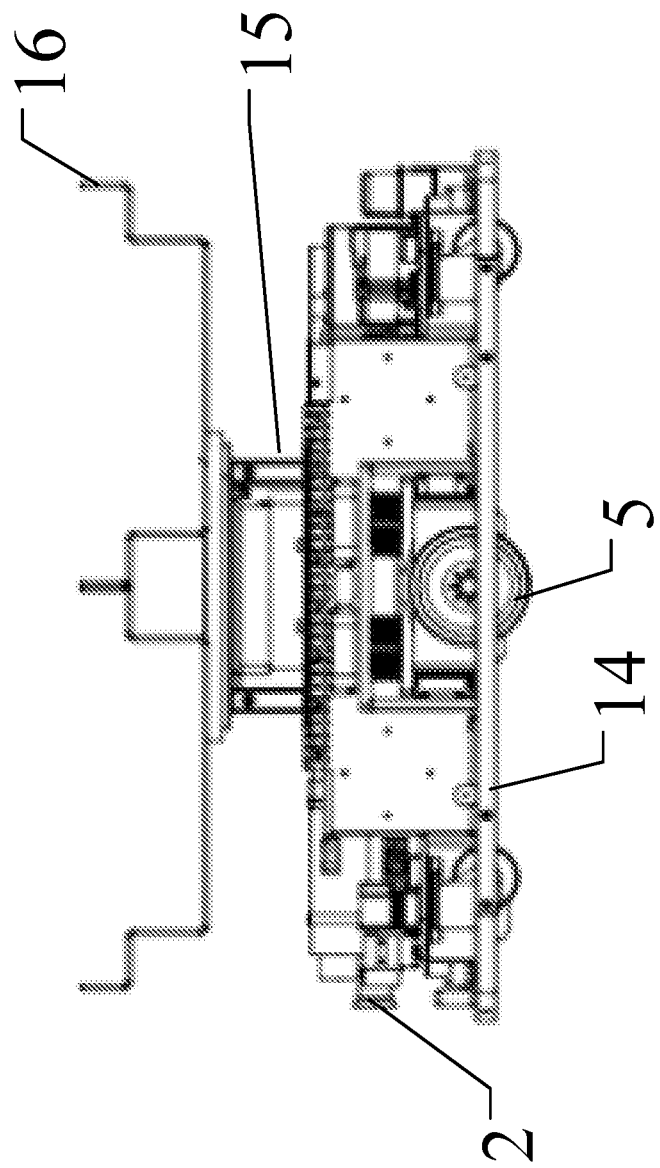
FIG. 10 is a third structural schematic diagram of a transport vehicle in another article transportation system provided by an embodiment of the present application.

FIG. 5 is a structural schematic diagram of another article transportation system provided by an embodiment of the present application, FIG. 6 is a first structural schematic diagram of an access vehicle in another article transportation system provided by an embodiment of the present application, and FIG. 7 is a second structural schematic diagram of an access vehicle in another article transportation system provided by an embodiment of the present application, FIG. 8 is a first structural schematic diagram of a transport vehicle in another article transportation system provided by an embodiment of the present application, FIG. 9 is a second structural schematic diagram of a transport vehicle in another article transportation system provided by an embodiment of the present application, and FIG. 10 is a third structural schematic diagram of a transport vehicle in another article transportation system provided by an embodiment of the present application. As shown in FIGS. 5-10, based on the embodiments shown in FIGS. 1-4, a transfer assembly 3 is located on an access vehicle 1 in the article transportation system.

The access vehicle 1 includes a first vehicle body 7, and a first drive assembly is located on the first vehicle body 7; and the first vehicle body 7 is also provided with a first control assembly 8, which is connected with the transfer assembly 3.

The first control assembly 8 is configured to control the transfer assembly 3 to transfer an article to a transport vehicle 2 located at the same position as the access vehicle 1, or to obtain an article from a transport vehicle 2 located at the same position as the access vehicle 1.

The transfer assembly 3 is an extension member; the first control assembly 8 is specifically configured to control extension and/or retraction of the extension member; an upper end of the first vehicle body 7 is provided with a horizontal slide rail, a lower surface of the extension member is slidably connected with the horizontal slide rail, and an upper surface of the extension member is of a flat plate shape. Alternatively, the transfer assembly 3 is a clamping member; and the first control assembly 8 is specifically configured to control the clamping and/or loosening of the clamping member.

The first vehicle body 7 is also provided with a navigation assembly 10, and the navigation assembly 10 and the first drive assembly are respectively connected with the first control assembly 8.

The first control assembly 8 is configured to obtain navigation information detected by the navigation assembly 10 and send a driving signal to the first drive assembly according to the navigation information.

The transport vehicle 2 is provided with a bearing member 16; the bearing member 16 is configured to bear the article, or the bearing member 16 is configured to receive the article on the transfer assembly 3.

The transport vehicle 2 includes a second vehicle body 14, and the bearing member 16 is located on the second vehicle body 14.

The second vehicle body 14 is also provided with a lifting assembly 15 and a second control assembly, the bearing member 16 is located at the top end of the lifting assembly 15, and the second control assembly is connected with the lifting assembly 15.

The lifting assembly 15 is configured to ascend and/or descend under the control of the second control assembly to drive the ascending and/or descending of the bearing member 16.

The bearing member 16 includes a first concave part 17 and a second concave part 18, an opposite pair of edges of the first concave part 17 are respectively provided with a first boss 19, the opposite pair of edges of the second concave part 18 are respectively provided with a second boss 20, and the central axis of the first boss 19 is parallel to the central axis of the second boss 20.

The same position is located on any area outside the aisle of the shelf.

Exemplarily, when the access vehicle 1 adopts a shelf-climbable robot, the solution provided in the above embodiment can be realized; however, due to a high cost of the shelf-climbable robot, the cost of the article transportation system is high when the shelf-climbable robot is adopted in the access vehicle 1; moreover, since the shelf-climbable robot can only dock with the transport vehicle 2 on the aisle of the shelf, other transport vehicles 2 cannot drive on the aisle during docking, which will cause congestion of the aisle, thus affect the article transportation. Thereby, a structure provided in the present embodiment can be adopted for the access vehicle 1.

The structure of each access vehicle 1 is described below. As shown in FIGS. 6-7, the access vehicle 1 consists of a first vehicle body 7, a first drive assembly, a first wheel structure 4, a first control assembly 8, a transfer assembly 3, a first speed limiting assembly 9 and a navigation assembly 10; that is, the transfer assembly 3 is located on the access vehicle 1; the first drive assembly, the first wheel structure 4, the first control assembly 8, the transfer assembly 3, the first speed limiting assembly 9 and the navigation assembly 10 are all arranged on the first vehicle body 7; moreover, the first control assembly 8 is respectively connected with the first drive assembly, the transfer assembly 3 and the navigation assembly 10. The connection includes an electrical connection mode and/or a mechanical connection mode. The electrical connection mode can be wired connection or wireless connection; and the first drive assembly is connected with the first wheel structure 4.

The first wheel structure 4 is provided with a climbing assembly 13 and a wheel assembly 12, where the climbing assembly 13 is configured to travel in the vertical direction, and the wheel assembly 12 is configured to travel on a preset plane.

The wheel assembly 12 is provided with a first motor, where the first motor is connected with the first drive assembly; the first control assembly 8 can control the first motor through the first drive assembly, thereby controlling movement of the wheel assembly 12, so that the access vehicle 1 can travel on a preset plane; moreover, the first motor is connected with the first speed limiting assembly 9. When the rotational speed of the first motor is excessively fast, the first speed limiting assembly 9 can limit the rotational speed of the first motor, thereby reducing the traveling speed of the access vehicle 1.

The climbing assembly 13 is provided with a second motor, where the second motor is connected with the first drive assembly; the first control assembly 8 can control the second motor through the first drive assembly, thereby controlling movement of the climbing assembly 13, so that the access vehicle 1 can travel in the vertical direction, for example, climb or descend on the vertical track of the shelf 6; moreover, the second motor is connected with the first speed limiting assembly 9. When the rotational speed of the second motor is excessively fast, the first speed limiting assembly 9 can limit the rotational speed of the second motor, thereby reducing climbing speed or descending speed of the access vehicle 1.

Since the navigation assembly 10 can further be provided with the first vehicle body 7, and a plurality of quick response codes are pasted on a preset plane, where the quick response codes are configured to identify a current position of the quick response codes; the navigation assembly 10 can obtain the quick response code on the preset plane, and then the navigation assembly 10 can determine the position of the access vehicle 1 according to the quick response code, thereby the navigation assembly 10 can generate navigation information, where the navigation assembly 10 can adopt a navigation device of the related art; the navigation assembly 10 sends the navigation information to the first control assembly 8; thereby, the first control assembly 8 can send a drive signal to the first drive assembly according to the navigation information, or the first control assembly 8 can send a drive signal to the first drive assembly according to the navigation information and a control instruction sent by a remote device; further, the first control assembly 8 drives the travel of the access vehicle 1 through the first drive assembly.

Moreover, when the access vehicle 1 and the transport vehicle 2 travel to a same position, the first control assembly 8 controls the transfer assembly 3 to transfer an article to the transport vehicle 2 located at the same position as the access vehicle 1; in addition, when the access vehicle 1 and the transport vehicle 2 travel to a same position, the first control assembly 8 can also control the transfer assembly 3 to obtain an article from the transport vehicle 2 located at the same position as the access vehicle 1 and place the article on the access vehicle 1.

The above-described same position is on any area outside an aisle of shelf 6. Since the shelf 6 consists of a plurality of sub-shelves, an aisle can be formed between the sub-shelves. When the access vehicle 1 leaves the shelf 6, the access vehicle 1 can travel to any area outside the aisle, then the access vehicle 1 reaches a certain position. At this time, the transport vehicle 2 also travels to this position; then, the access vehicle 1 and the transport vehicle 2 are transfer the article at this position. Since it is not necessary to transfer the article between the access vehicle 1 and the transport vehicle 2 on the aisle of the shelf 6, the access vehicle 1 and the transport vehicle 2 can transfer the article at any position on a preset plane outside the aisle; thereby, when transferring the article between the access vehicle 1 and the transport vehicle 2, it will not hinder the travel of other access vehicles 1 and other transport vehicles 2; other access vehicles 1 and other transport vehicles 2 do not need to wait for the completion of the article transfer before traveling; furthermore, it will not cause road congestion, and can improve the traveling efficiency of access vehicle 1 and transport vehicle 2, and improve the efficiency of the article transfer. The first power supply assembly 11 can be arranged on the first vehicle body 7, and the first power supply assembly 11 is connected with the first control assembly 8 and the navigation assembly 10 respectively. Further, the first power supply assembly 11 can supply power to the first control assembly 8 and the navigation assembly 10.

For the transfer assembly 3 of the access vehicle 1, the following implementation manners are provided.

First implementation manner of the transport assembly 3. The transfer assembly 3 is an extension member; a pair of parallel horizontal slide rails can be provided at an upper end of the access vehicle 1, lower surface of the extension member can be slidably connected with the horizontal slide rail, thereby the extension member can slide on the horizontal slide rail; moreover, the upper surface of the extension member is of a flat plate shape, so that the article can be placed on the extension member. Since the first control assembly 8 is connected with the extension member, the first control assembly 8 can control extension and/or retraction of the extension member. Thereby, the first control assembly 8 can control the extension of the extension member, then the article on the extension member is placed on the transport vehicle 2, then the first control assembly 8 can control the extension member to retract. Or, the first control assembly 8 can control the extension member to extend, then the first control assembly 8 can obtain the article on the transport vehicle 2, and then the first control assembly 8 can control the extension member to retract, thereby placing the article on the access vehicle 1.

Second implementation manner of the transport assembly 3. The transfer assembly 3 is a clamping member; and since the first control assembly 8 is connected with the clamping member, the first control assembly 8 can control the clamping and/or loosening of the clamping member. Thereby, the first control assembly 8 can control the clamping part to loosen, and then place the article on the clamping part on the transport vehicle 2. Then, the first control assembly 8 can control the clamping part to clamp. Or, the first control assembly 8 can control the clamping part to clamp, and then the first control assembly 8 can obtain the article on the transport vehicle 2, and then the first control assembly 8 can control the clamping part to loosen, so as to place the article on the access vehicle 1.

The structure of each transport vehicle 2 is described below. As shown in FIG. 8-10, the transport vehicle 2 consists of a second vehicle body 14, a second drive assembly, a second wheel structure 5, a second control assembly, a lifting assembly 15 and a bearing member 16; the second drive assembly, the second wheel structure 5, the second control assembly, the lifting assembly 15 and the bearing member 16 are all arranged on the second vehicle body 14. The second control assembly is respectively connected with the second drive assembly and the lifting assembly 15. The connection includes electrical connection mode and/or mechanical connection mode. The electrical connection mode can be wired connection or wireless connection; the second drive assembly is connected to the second wheel structure 5.

The second wheel structure 5 is provided with a third motor, where the third motor is connected with the second drive assembly; the second control assembly can control the third motor through the second drive assembly, and then control the movement of the second wheel structure 5, so that the transport vehicle 2 can travel on a preset plane; moreover, the third motor is connected with the second speed limiting assembly. When the rotational speed of the third motor is excessively fast, the second speed limiting assembly can limit the rotational speed of the third motor, thereby reducing the traveling speed of the transport vehicle 2.

The lifting assembly 15 is located at an upper end of the second vehicle body 14, and the bearing member 16 is arranged at an upper end of the lifting assembly 15; the bearing member 16 is configured to bear an article, or the bearing member 16 is configured to receive an article on the transfer assembly 3 of the access vehicle 1. Optionally, the bearing member 16 is a tray. Specifically, as shown in FIG. 9, a bottom of the bearing member 16 is fixedly connected with the upper end of the lifting assembly 15. The bearing member 16 includes a first concave part 17 and a second concave part 18, where the first concave part 17 has two pairs of opposite edges, one pair of which is provided with a first boss 19 respectively, and the second concave part 18 has two pairs of opposite edges, one pair of which are respectively provided with a second boss 20, and the central axis of the first boss 19 is parallel to the central axis of the second boss 20; thereby, two articles can be placed on the bearing member 16 at the same time, i.e., one article is placed on the first concave part 17 and another article is placed on the second concave part 18. The second control assembly can control ascending and/or descending of the lifting assembly 15. Since the bearing member 16 is located at the upper end of the lifting assembly 15, the lifting assembly 15 drives ascending and/or descending of the bearing member 16; then, the bearing member 16 performs position docking with the transfer assembly 3.

A second power supply assembly can be provided on the second vehicle body 14, where the second vehicle body 14 is respectively connected with the second control assembly and the lifting assembly 15, and then the second power supply assembly can supply power to the second control assembly and the lifting assembly 15.

Based on the above structure and connection relationship, the transportation of an article can be divided into the following situations.

First situation. The first control assembly 8 of the access vehicle 1 can control the second motor through the first drive assembly, and then control movement of the climbing assembly 13, so that the access vehicle 1 can travel vertically on the shelf 6. At this time, the climbing assembly 13 coincides with a vertical track of the shelf 6. The access vehicle 1 can reach the location of the article.

Then, the first control assembly 8 of the access vehicle 1 can control the transfer assembly 3 to obtain the article on the shelf 6. For example, the transfer assembly 3 is an extension member, and a first control assembly controls the transfer assembly 3 to slide on a slide rail so that the transfer assembly 3 can reach the lower side of the article, that is, the transfer assembly 3 is extended, as shown in FIG. 5, and then the transfer assembly 3 supports the article; then, the first control assembly again controls the transfer assembly 3 to slide on the slide rail so that the transfer assembly 3 slides to an upper side of the access vehicle 1, that is, the transfer assembly 3 is stowed; thereby, through the above process, the transfer assembly 3 uplifts and supports the article, where the transfer assembly 3 can obtain more than two articles.

Then, the first control assembly 8 controls the second motor through the first drive assembly again, and then controls the movement of the climbing assembly 13, so that the access vehicle 1 can travel vertically on the shelf 6, so that the access vehicle 1 leaves the shelf 6. For example, if the preset plane is ground, then the access vehicle 1 reaches the ground; or, if the preset plane is the top end of the shelf 6, then the access vehicle 1 reaches the top end of the shelf 6; or, if the preset plane is a plane located on the same plane as the top end of the shelf 6, then the access vehicle 1 reaches the plane. Thus, after the access vehicle 1 can obtain the article from the shelf 6, the access vehicle 1 leaves the shelf 6.

The navigation assembly 10 of the access vehicle 1 can navigate according to the quick response code on the preset plane; and then the first control assembly 8 can control the first motor through the first drive assembly, and then control the movement of the wheel assembly 12, so that the access vehicle 1 can travel on the preset plane; then, the access vehicle 1 travels to a certain position on the preset plane.

At this time, a second control assembly of the transport vehicle 2 can also navigate the transport vehicle 2 through the quick response code. In a process of navigation, the second control assembly can control the third motor through the second drive assembly, and then control the movement of the second wheel structure 5, so that the transport vehicle 2 can travel on the preset plane. Then, the transport vehicle 2 and the access vehicle 1 arrive at a same position on the preset plane.

At this time, the second control assembly of the transport vehicle 2 controls the lifting assembly 15 to ascend and/or descend, so that, as shown in FIGS. 9 and 10, the bearing member 16 on the lifting assembly 15 rises or falls so that the upper surface of the bearing member 16 is parallel to the upper surface of the transfer assembly 3 of the access vehicle 1; then, the first control assembly 8 of the access vehicle 1 controls the transfer assembly 3 to transfer the article to the transport vehicle 2. For example, the transfer assembly 3 is an extension member, the first control assembly 8 of the access vehicle 1 controls the transfer assembly 3 to slide on the slide rail, and then the first control assembly 8 can control the transfer assembly 3 to extend, and the transfer assembly 3 brings the article to the top of the bearing member 16; then, the first control assembly 8 of the access vehicle 1 controls the transfer assembly 3 to slide on the slide rail again so that the transfer assembly 3 is stowed. At this time, the article of the transfer assembly 3 will fall on the bearing member 16. Thus, through the above process, the access vehicle 1 places the article on the transfer assembly 3 of the transport vehicle 2.

Then, the transport vehicle 2 can transport the article; the access vehicle 1 docked with the transport vehicle 2 can return to the shelf 6 again for access and placement of the article.

Through the above process of the aforementioned first situation, the access vehicle 1 can place the article on the transport vehicle 2, and then complete the transfer and transportation of the article between the access vehicle 1 and the transport vehicle 2.

The second situation. The second control assembly of the transport vehicle 2 can also navigate the transport vehicle 2 through the quick response code. During the navigation, the second control assembly can drive the transport vehicle 2 to travel on a preset plane through the second drive assembly. Then, the transport vehicle 2 travels to a certain position on the preset plane.

At this time, the navigation assembly 10 of the access vehicle 1 can navigate according to the quick response code on the preset plane; further, the first control assembly 8 can drive the access vehicle 1 to travel on a preset plane through the first drive assembly; then, the access vehicle 1 and the transport vehicle 2 arrive at the same position on the preset plane. For example, the preset plane is the ground, or the preset plane is the top end of shelf 6, and the preset plane is a plane located in the same plane as the top end of shelf 6.

At this time, the second control assembly of the transport vehicle 2 controls the bearing member 16 to ascend and/or descend through the lifting assembly 15, thereby enabling that the upper surface of the bearing member 16 is parallel to the upper surface of the transfer assembly 3 of the access vehicle 1. Then, the first control assembly 8 of the access vehicle 1 controls the transfer assembly 3 to obtain an article from the transport vehicle 2. For example, the transfer assembly 3 is an extension member, the first control assembly 8 of the access vehicle 1 controls the transfer assembly 3 to slide on the slide rail, and then the first control assembly 8 can control the transfer assembly 3 to extend, the transfer assembly 3 extend to the lower side of the article on the bearing member 16, that is, the transfer assembly 3 is located between the article and the bearing member 16; then, the first control assembly 8 of the access vehicle 1 controls the transfer assembly 3 to slide on the slide rail again so that the transfer assembly 3 is stowed. At this time, the transfer assembly 3 uplifts the article; then, the first control assembly 8 of the access vehicle 1 continues to control the transport assembly 3 to be stowed, and the article will fall on the access vehicle 1. Thus, through the above process, the access vehicle 1 fetches the article on the transport vehicle 2 to the access vehicle 1.

Then, the transport vehicle 2 can continue to transport other article. Moreover, the navigation assembly 10 of the access vehicle 1 can navigate again according to the quick response code on the preset plane; and the access vehicle 1 moves to a position of shelf 6.

Then, the first control assembly 8 of the access vehicle 1 controls the second motor through the first drive assembly, and then controls the movement of the climbing assembly 13, so that the access vehicle 1 can travel vertically on the shelf 6.

The access vehicle 1 reaches a location where the article needs to be placed. Then, the first control assembly 8 of the access vehicle 1 controls the transfer assembly 3 to place the article on the shelf 6. For example, the transfer assembly 3 is an extension member, and the first control assembly 8 of the access vehicle 1 can control the transfer assembly 3 to extend, so that the article are located above a storage plate of the shelf 6. Then, the first control assembly 8 can control the transfer assembly 3 to retract, so that the article fall on the storage plate, and then the article are placed on the storage shelf 6.

Then, the access vehicle 1 continues to perform processing such as accessing other articles, placing them on the shelf 6, and placing them on other transport vehicles 2, and the like.

Through the above process of the aforementioned second situation, the access vehicle 1 can obtain an article from the transport vehicle 2, place the article on the shelf 6, and then the transfer and the transportation of the article between the access vehicle 1 and the transport vehicle 2 is completed.

In the present embodiment, through that any access vehicle 1 travels on a preset plane and in a vertical direction, and any transport vehicle 2 travels on the preset plane, when the access vehicle 1 and the transport vehicle 2 travel to a same position, a transport assembly 3 on the access vehicle 1 or the transport vehicle 2 transfer an article. Through the above process, the docking of the article can be completed between the access vehicle 1 and the transport vehicle 2, and the transfer of article can be completed quickly, and then the access vehicle 1 and the transport vehicle 2 can fetch or place an article again quickly, which can reduce the time consumed in the fetching and transportation of an article and improve the transportation efficiency of an article. Moreover, any access vehicle 1 and any transport vehicle 2 can dock at any position on the preset plane to realize the transfer of an article; due to a variety of docking positions, traveling of other access vehicles 1 and other transport vehicles 2 will not be affected, and will not cause congestion of traffic, thereby the efficiency of article transfer is high, and then efficiency of article transportation is high; and the docking and the transportation manner is very flexible. Moreover, the access vehicle 1 can place an article of a shelf 6 on the transport vehicle 2 for transportation, and the access vehicle 1 can also obtain an article from the transport vehicle 2 and place the article on the shelf 6; a bearing member 16 on each transport vehicle 2 can carry a plurality of articles at the same time, so that each transport vehicle 2 can transport a plurality of articles at the same time, improving the fetching and transportation efficiency of articles.

FIG. 11 is a structural schematic diagram of another article transportation system provided by an embodiment of the present application. As shown in FIG. 11, on a basis of the above embodiment, the article transportation system provided by the present embodiment further includes a shelf 6, on which the access vehicle 1 is configured to vertical travel, where the access vehicle 1 and the transport vehicle 2 can refer to an introduction of the article transportation system provided by the aforementioned embodiments, and the structure and principle thereof are the same as the access vehicle 1 and the transport vehicle 2 of the article transportation system provided by the aforementioned embodiments.

Exemplarily, the shelf 6 consists of a plurality of sub-shelves, the adjacent sub-shelves are fixed connected, and there is a certain spatial distance between the adjacent sub-shelves. Each sub-shelf includes four vertical brackets, and each sub-shelf is provided with a plurality of grid units, and each grid unit of the same sub-shelf is vertically arranged on the sub-shelf; each grid unit consists of a storage plate, which is fixedly arranged on the four vertical brackets of the sub-shelf, i.e., four edges of the storage plate are respectively connected with the four vertical brackets one by one, and the storage plate is configured to place the article.

In addition, each sub-shelf is provided with a vertical track, which is used for the access vehicle 1 to climb. For example, the vertical track on each sub-shelf is laid on the vertical bracket, i.e., the central axis of the vertical track is parallel to the central axis of the vertical bracket, and then, the access vehicle 1 can travel vertically on each sub-shelf.

Optionally, a horizontal track can also be provided on the sub-shelf, and the horizontal track is laid on an edge of the storage plate, i.e., the central axis of the horizontal track is parallel to the central axis of the edge of the storage plate; moreover, the horizontal tracks of adjacent sub-shelves can be connected, and then, the access vehicle 1 can move horizontally between the sub-shelves.

Optionally, a stairway can be provided on a side of the shelf 6, which is used for the user to walk, and then the user can enter the shelf 6 through the stairway.

The article transportation system provided by the embodiment further includes a control device; the control device can be connected with each access vehicle 1, where the connection can be wired connection or wireless connection, so that the control device sends a control instruction to the access vehicle 1 to control traveling and positioning of the access vehicle 1 and the like; and the control device can be connected with each transport vehicle 2, where the connection can be wired connection or wireless connection, so that the control device sends a control instruction to the transport vehicle 2 to control traveling and positioning of the transport vehicle 2 and the like.

The article transportation system provided by the embodiment further includes a conveying device 22 and at least one sorting device 21.

The conveying device 22 is constituted of a controller, a support structure and a conveyor belt; where the support structure can be arranged on a preset surface, and the support structure can be any structure that can support the conveyor belt; the conveyor belt is arranged on the support structure, and the conveyor belt can roll cyclically on the support structure; moreover, the controller is configured to control the cyclical rolling of the conveyor belt.

Each sorting device 21 is arranged on a side of the conveying device 22. For example, the sorting device 21 may be a console, where after an article on the sorting device 21 is manually processed, the processed article can be manually placed on the conveying device 22. For another example, the sorting device 21 may be an automatic sorting machine, which can realize intelligent processing of an article, and the sorting machine places the processed article on the conveying device 22.

For example, the access vehicle 1 can obtain an article from the shelf 6; then, the access vehicle 1 docks with the transport vehicle 2, and the access vehicle 1 places the article on the transport vehicle 2; the transport vehicle 2 then transports the article to the sorting device 21; after the sorting device 21 performs sorting, the sorting device 21 places the sorted article to the conveying device 22; the conveying device 22 conveys the article to a specified place or specified device.

For another example, the sorting device 21 can obtain an article from the conveying device 22, and the sorting device 21 sorts the articles; the transport vehicle 2 obtains the article on the sorting device 21; then, the access vehicle 1 docks with the transport vehicle 2, and the access vehicle 1 obtains the article from the transport vehicle 2; then, the access vehicle 1 places the article on the shelf 6.

In the present embodiment, the docking of an article can be completed between the access vehicle 1 and the transport vehicle 2, and the transfer of article can be completed quickly, and then the access vehicle 1 and the transport vehicle 2 can fetch or place an article again quickly, which can reduce the time consumed in the fetching and transportation of an article, improve the transportation efficiency of an article. Moreover, any access vehicle 1 and any transport vehicle 2 can dock at any position on the preset plane to realize the transfer of an article; due to the variety of docking positions, the efficiency of article transfer is high, and then the efficiency of article transportation is high; the manner of docking and transportation is very flexible. Moreover, the access vehicle 1 can place an article on a shelf 6 onto the transport vehicle 2 for transportation, and the access vehicle 1 can also obtain an article from the transport vehicle 2 and place the article on the shelf 6; a bearing member 16 on each transport vehicle 2 can bear a plurality of articles at the same time, so that each transport vehicle 2 can transport a plurality of articles at the same time, improving the fetching and transportation efficiency of the articles.

In the above embodiments, the process involving communication can be implemented in whole or in part by software, hardware, firmware or any combination thereof. When implemented in software, it can be implemented in whole or in part in a form of a computer program product. A computer program product includes one or more computer instructions. When the computer program instructions are loaded and executed on the computer, a process or function according to an embodiment of the present application is generated in whole or in part. The computer may be a general-purpose computer, a special-purpose computer, a computer network, or other programmable apparatus. Computer instructions may be stored in a computer-readable storage medium or transmitted from one computer-readable storage medium to another computer-readable storage medium. For example, computer instructions may be transmitted through a wired, (e.g., coaxial cable, optical fiber, digital subscriber line (digital subscriber line, DSL) from a website site, computer, data processing digital subscriber line, or data center) or wireless (e.g., infrared, wireless, microwave, etc.) way to another website site, computer, data processing device or data center. The computer-readable storage medium can be any available medium that can be accessed by a computer, or a data processing device, data center and other data storage device containing or integrated with one or more available media. The available medium may be magnetic medium (e.g., floppy disk, hard disk, magnetic tape), optical medium (e.g., DVD), or semiconductor medium (e.g., solid state disk (solid state disk, SSD)), etc.

Those skilled in the art should be aware that, in one or more of the above examples, a function related to communication described in the embodiments of the present application can be realized by hardware, software, firmware or any combination thereof. When implemented using software, these functions can be stored in a computer-readable medium or transmitted as one or more instructions or codes on the computer-readable medium. The computer-readable medium includes a computer storage medium and a communication medium, where the communication medium includes any medium that facilitates transfer of a computer program from one place to another place. The storage medium can be any available medium that can be accessed by a general-purpose or special-purpose computer.

It should be understood that the present application is not limited to the precise structure described above and shown in the accompanying drawings, and various modifications and changes can be made without departing from a scope thereof. The scope of the present application is merely limited by the appended claims.

The invention claimed is:

1. A first article transportation system, comprising:
at least one access vehicle and at least one transport vehicle;
each of the access vehicle is provided with a first drive assembly, and each transport vehicle is provided with a second drive assembly;
the first drive assembly is configured to drive the access vehicle to travel on a preset plane and in a vertical direction, and the second drive assembly is configured to drive the transport vehicle to travel on the preset plane; and
the access vehicle or the transport vehicle is provided with a transfer assembly; and the transfer assembly is configured to transfer an article from one of the access vehicle and the transport vehicle to another when the access vehicle and the transport vehicle travel to a same position,
wherein the same position is located on any area outside an aisle of a shelf.

2. The first system according to claim 1, wherein the transfer assembly is located on the access vehicle;
the access vehicle comprises a first vehicle body, and the first drive assembly is located on the first vehicle body; the first vehicle body is also provided with a first control assembly, and the first control assembly is connected with the transfer assembly; and
the first control assembly is configured to control the transfer assembly to transfer an article to a transport vehicle located at the same position as the access vehicle, or obtain the article from the transport vehicle located at the same position as the access vehicle.

3. The first system according to claim 2, wherein the transfer assembly is an extension member; and
the first control assembly is specifically configured to control extension and/or retraction of the extension member.

4. The first system according to claim 3, wherein an upper end of the first vehicle body is provided with a horizontal slide rail, a lower surface of the extension member is slidably connected with the horizontal slide rail, and an upper surface of the extension member is of a flat plate shape.

5. The first system according to claim 2, wherein the transfer assembly is a clamping member; and
the first control assembly is specifically configured to control clamping and/or loosening of the clamping member.

6. The first system according to claim 2, wherein the first vehicle body is also provided with a navigation assembly, the navigation assembly and the first drive assembly are respectively connected with the first control assembly; and
the first control assembly is configured to obtain navigation information detected by the navigation assembly and send a drive signal to the first drive assembly according to the navigation information.

7. The first system according to claim 2, wherein the transport vehicle is provided with a bearing member; and
the bearing member is configured to bear an article, or the bearing member is configured to receive an article on the transfer assembly.

8. The first system according to claim 7, wherein the transport vehicle comprises a second vehicle body, and the bearing member is located on the second vehicle body;

the second vehicle body is further provided with a lifting assembly and a second control assembly, the bearing member is located at the top end of the lifting assembly, and the second control assembly is connected with the lifting assembly; and
the lifting assembly is configured to ascend and/or descend under control of the second control assembly to drive the ascending and/or descending of the bearing member.

9. The first system according to claim 7, wherein the bearing member comprises a first concave part and a second concave part, where an opposite pair of edges of the first concave part are respectively provided with a first boss, an opposite pair of edges of the second concave part are respectively provided with a second boss, and a central axis of the first boss is parallel to a central axis of the second boss.

10. The first system according to claim 2, wherein the first control assembly of the access vehicle is further configured to control the access vehicle to travel vertically on the shelf, leave the shelf, and travel to the area outside the aisle of the shelf.

11. The first system according to claim 1, wherein the preset plane is ground, or a top end of the shelf, or a plane located on a same plane as the top end of the shelf.

12. A second article transportation system, comprising: a first article transportation system, a shelf, a control device, a sorting device and a conveying device;
the access vehicle is configured to travel vertically on the shelf;
the control device is configured to send a control instruction to the transport vehicle;
the sorting device is configured to receive and sort an article transported by the transport vehicle and place the article on the transport device; and
the conveying device is configured to convey the article placed by the sorting device;
wherein the first article transportation system comprises:
at least one access vehicle and at least one transport vehicle;
each of the access vehicle is provided with a first drive assembly, and each transport vehicle is provided with a second drive assembly;
the first drive assembly is configured to drive the access vehicle to travel on a preset plane and in a vertical direction, and the second drive assembly is configured to drive the transport vehicle to travel on the preset plane; and
the access vehicle or the transport vehicle is provided with a transfer assembly; and the transfer assembly is configured to transfer an article from one of the access vehicle and the transport vehicle to another when the access vehicle and the transport vehicle travel to a same position,
wherein the same position is located on any area outside an aisle of the shelf.

13. The second system according to claim 12, wherein the transfer assembly is located on the access vehicle;
the access vehicle comprises a first vehicle body, and the first drive assembly is located on the first vehicle body; the first vehicle body is also provided with a first control assembly, and the first control assembly is connected with the transfer assembly; and
the first control assembly is configured to control the transfer assembly to transfer an article to a transport vehicle located at the same position as the access vehicle, or obtain the article from the transport vehicle located at the same position as the access vehicle.

14. The second system according to claim 13, wherein the transfer assembly is an extension member; and
the first control assembly is specifically configured to control extension and/or retraction of the extension member.

15. The second system according to claim 14, wherein an upper end of the first vehicle body is provided with a horizontal slide rail, a lower surface of the extension member is slidably connected with the horizontal slide rail, and an upper surface of the extension member is of a flat plate shape.

16. The second system according to claim 13, wherein the transfer assembly is a clamping member; and
the first control assembly is specifically configured to control clamping and/or loosening of the clamping member.

17. The second system according to claim 13, wherein the first vehicle body is also provided with a navigation assembly, the navigation assembly and the first drive assembly are respectively connected with the first control assembly; and
the first control assembly is configured to obtain navigation information detected by the navigation assembly and send a drive signal to the first drive assembly according to the navigation information.

18. The second system according to claim 13, wherein the transport vehicle is provided with a bearing member; and
the bearing member is configured to bear an article, or the bearing member is configured to receive an article on the transfer assembly.

19. The second system according to claim 18, wherein the transport vehicle comprises a second vehicle body, and the bearing member is located on the second vehicle body;
the second vehicle body is further provided with a lifting assembly and a second control assembly, the bearing member is located at the top end of the lifting assembly, and the second control assembly is connected with the lifting assembly; and
the lifting assembly is configured to ascend and/or descend under control of the second control assembly to drive the ascending and/or descending of the bearing member.

20. The second system according to claim 18, wherein the bearing member comprises a first concave part and a second concave part, where an opposite pair of edges of the first concave part are respectively provided with a first boss, an opposite pair of edges of the second concave part are respectively provided with a second boss, and a central axis of the first boss is parallel to a central axis of the second boss.

* * * * *